US011745765B2

(12) United States Patent
Park et al.

(10) Patent No.: US 11,745,765 B2
(45) Date of Patent: Sep. 5, 2023

(54) ELECTRONIC DEVICE AND METHOD FOR ASSISTING WITH DRIVING OF VEHICLE

(71) Applicant: SAMSUNG ELECTRONICS CO., LTD., Suwon-si (KR)

(72) Inventors: Yosub Park, Suwon-si (KR); Boseok Moon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 223 days.

(21) Appl. No.: 16/864,562

(22) Filed: May 1, 2020

(65) Prior Publication Data
US 2020/0346663 A1 Nov. 5, 2020

(30) Foreign Application Priority Data

May 3, 2019 (KR) .................. 10-2019-0052380

(51) Int. Cl.
B60W 60/00 (2020.01)
G08G 1/0967 (2006.01)
(Continued)

(52) U.S. Cl.
CPC ....... B60W 60/0015 (2020.02); G08G 1/0967 (2013.01); G08G 1/166 (2013.01);
(Continued)

(58) Field of Classification Search
CPC ......... B60W 60/0015; B60W 2556/45; B60W 40/02; G08G 1/0967; G08G 1/166;
(Continued)

(56) References Cited

U.S. PATENT DOCUMENTS 9,620,017 B2   4/2017 Trageser
10,235,882 B1*  3/2019 Aoude .................. G08G 1/163
(Continued)

FOREIGN PATENT DOCUMENTS

CN   104115198 A   10/2014
CN   107316436 A   11/2017
(Continued)

OTHER PUBLICATIONS

Communication dated Aug. 14, 2020 issued by the International Searching Authority in counterpart Application No. PCT/KR2020/005693 (PCT/ISA/220, PCT/ISA/210, and PCT/ISA/237).
Anonymous, "Intelligent Transport Systems (ITS); Vehicular Communications; Basic Set of Applications Part 3: Specifications of Decentralized Environmental Notification Basic Service", Sep. 2014, Final draft ETSI EN 302 637-3 V1.2.1, 73 pages total.
(Continued)

Primary Examiner — Muhammad Shafi
(74) Attorney, Agent, or Firm — Sughrue Mion, PLLC

(57) ABSTRACT

An electronic device and a method for assisting autonomous driving of a vehicle are provided. The electronic device includes: a communicator; a memory storing one or more instructions; and a processor configured to execute the one or more instructions stored in the memory to: obtain object data of an object located in a driving environment of the vehicle; based on determining that the object incapable of communicating with the vehicle, obtain an object situation of the object, the object situation being determined based on the object data; determine whether the object situation is a dangerous situation; based on determining the object situation, determine a message type for notifying at least one of the object data and the object situation to the vehicle; and transmit a message generated according to the determined message type through the communicator.

18 Claims, 17 Drawing Sheets

(51) Int. Cl.
    *H04W 4/90*     (2018.01)
    *G08G 1/16*     (2006.01)
    *H04W 4/44*     (2018.01)

(52) U.S. Cl.
    CPC .............. *H04W 4/44* (2018.02); *H04W 4/90* (2018.02); *B60W 2556/45* (2020.02)

(58) Field of Classification Search
    CPC ....... G08G 1/096741; G08G 1/096783; G08G 1/163; G08G 1/164; G08G 1/04; H04W 4/44; H04W 4/90; H04W 4/025; H04W 4/12; H04W 4/70
    USPC .......................................................... 701/26
    See application file for complete search history.

(56) References Cited

U.S. PATENT DOCUMENTS

| | | | |
|---|---|---|---|
| 10,611,383 B2 | 4/2020 | Bae | |
| 2004/0130463 A1* | 7/2004 | Bloomquist | G08G 1/096783 340/425.5 |
| 2005/0073438 A1* | 4/2005 | Rodgers | G08G 1/161 340/944 |
| 2013/0278441 A1 | 10/2013 | Rubin et al. | |
| 2015/0187216 A1 | 7/2015 | Kwak | |
| 2015/0221221 A1* | 8/2015 | Schaefer | G08G 1/096783 340/905 |
| 2015/0339534 A1 | 11/2015 | Morikawa et al. | |
| 2017/0019243 A1 | 7/2017 | Min et al. | |
| 2017/0192436 A1 | 7/2017 | Min et al. | |
| 2019/0043359 A1 | 2/2019 | Rajakondala | |
| 2019/0174547 A1* | 6/2019 | Khoryaev | H04L 47/12 |
| 2019/0349957 A1* | 11/2019 | Sorrentino | H04L 67/51 |

FOREIGN PATENT DOCUMENTS

| | | |
|---|---|---|
| CN | 108510771 A | 9/2018 |
| JP | 2006-185136 A | 7/2006 |
| JP | 2008-15920 A | 1/2008 |
| JP | 2017-224211 A | 12/2017 |
| KR | 10-2015-0075774 A | 7/2015 |
| KR | 10-1838968 B1 | 4/2018 |
| WO | 2018/146808 A1 | 8/2018 |

OTHER PUBLICATIONS

Anonymous, "Intelligent Transport Systems (ITS); Vehicular Communications; Basic Set of Applications; Part 2: Specification of Cooperative Awareness Basic Service", Sep. 2014, Final draft ETSI EN 302 637-2 V1.3.1, 44 pages total.
Anonymous, "Intelligent Transport Systems (ITS); V2X Applications; Part 1: Road Hazard Signalling (RHS) application requirements specification", Aug. 2013, ETSI TS 101 539-1 V1.1.1, 38 pages total.
Anonymous, "Intelligent Transport Systems (ITS); V2X Applications; Part 2: Intersection Collision Risk Warning (ICRW) application requirements specification", Jun. 2018, ETSI TS 101 539-2 V1.1.1, 30 pages total.
Anonymous, "Intelligent Transport Systems (ITS); V2X Applications; Part 3: Longitudinal Collision Risk Warning (LCRW) application requirements specification", Nov. 2013, ETSI TS 101 539-3 V1.1.1, 29 pages total.
Anonymous, "MEC API Activity", Last Edited Feb. 2019, MEC Wiki, retried from https://mecwiki.etsi.org/index.php?title=Main_Page, 2 pages total.
Cameron, O., "An Introduction to LIDAR: The Key Self-Driving Car Sensor", May 2017, Voyage, retrieved from: https://news.voyage.auto/an-introduction-to-lidar-the-key-self-driving-car-sensora7e405590cff, 5 pages total.
Dabboussi, Abdallah et al., "Dependability Overview for Autonomous Vehicles and Reliability Analysis for Basic Safety Messages", 2018 Sixth International Conference on Digital Information, Networking, and Wireless Communications (DINWC), IEEE, Apr. 25, 2018, pp. 86-91, XP033339195. (6 pages total).
Joo, Yang-Ick et al., "An Efficient Beacon Scheduling Scheme for Multi-hop in Vehicular Environments", Wireless Personal Communications, Springer, Dordrecht, NL, vol. 83, No. 2, Feb. 27, 2015, pp. 1085-1099, XP035508025. (15 pages total).
Communication dated Apr. 7, 2022 by the European Patent Office in counterpart European Patent Application No. 20802149.3.
Communication dated Sep. 29, 2022 issued by the Chinese Patent Office in CN Patent Application English No. 202080033447.2.
Communication dated Apr. 27, 2023, issued by the National Intellectual Propelty Administration in Chinese Application No. 202080033447.2.

* cited by examiner

ELECTRONIC DEVICE AND METHOD FOR ASSISTING WITH DRIVING OF VEHICLE

CROSS-REFERENCE TO RELATED APPLICATION(S)

This application is based on and claims priority under 35 U.S.C. § 119 to Korean Patent Application No. 10-2019-0052380, filed on May 3, 2019, in the Korean Intellectual Property Office, the disclosure of which is incorporated by reference herein in its entirety.

BACKGROUND

1. Field

The disclosure relates to an electronic device and an operating method of the electronic device, and more particularly, to an electronic device and a method for assisting with driving of a vehicle.

2. Description of Related Art

Due to the convergence of information and communication technologies and the automotive industry, automobile smartization is rapidly progressing. Due to smartization, automobiles are evolving from simple mechanical devices to smart cars, and autonomous driving is drawing attention as a key technology of smart cars.

Autonomous driving is a technology in which a vehicle reaches its destination without the driver controlling the driving functions of a vehicle, such as manipulating the steering wheel, accelerator pedal, or brakes.

Recently, various additional functions related to autonomous driving have been developed, and research on a method for providing a safe autonomous driving experience to occupants by controlling various components of a vehicle based on recognized driving environment continue to thrive to improve autonomous driving experience.

SUMMARY

Provided are an electronic device and a method for assisting with driving of a vehicle. Also, provided is a computer-readable recording medium having recorded thereon a program for executing the method on a computer. The technical problem to be solved is not limited to the technical problem as described above, and other technical problems may be solved by way of practicing the embodiments of the disclosure.

Additional aspects will be set forth in part in the following description and, in part, will be apparent from the description, or may be learned by practice of the embodiments of the disclosure.

According to an embodiment, there is provided an electronic device for assisting autonomous driving of a vehicle. The electronic device includes a communicator; a memory storing one or more instructions; and a processor configured to execute the one or more instructions stored in the memory to: obtain object data of an object located in a driving environment of the vehicle; based on determining that the object incapable of communicating with the vehicle, obtain an object situation of the object, the object situation being determined based on the object data; determine whether the object situation is a dangerous situation; based on determining the object situation, determine a message type for notifying at least one of the object data and the object situation to the vehicle; and transmit a message generated according to the determined message type through the communicator.

The processor is further configured to execute the one or more instructions to generate an emergency message including information about the dangerous situation and transmit the emergency message to the vehicle.

The processor is further configured to execute the one or more instructions to determine a transmission time point for transmitting the emergency message based on a degree of danger of the dangerous situation.

The processor is further configured to execute the one or more instructions to determine a number of times to transmit the emergency message, based on a degree of danger of the dangerous situation.

The processor is further configured to execute the one or more instructions to determine a communication channel among a plurality of communication channels through which the emergency message is to be transmitted, based on a degree of danger of the dangerous situation.

The processor is further configured to execute the one or more instructions to, based on determining that the object situation is not a dangerous situation, generate a default message and transmit the default message based on a pre-set cycle.

The processor is further configured to execute the one or more instructions to determine whether the object is capable of communicating with the vehicle, based on at least one of the obtained object data or identification information of the object, the identification information being transmitted from the object.

The electronic device further includes a sensing unit comprising at least one sensor. The processor is further configured to execute the one or more instructions to control the at least one sensor to obtain the object data of the object.

The processor is further configured to execute the one or more instructions to receive the object data obtained by an external server from the external server through the communicator.

The object data includes at least one of a time point at which the object is sensed, a location of the object, a moving speed of the object, a moving direction of the object, or an expected moving path of the object.

The processor is further configured to execute the one or more instructions to analyze the object situation of the object, the object situation indicating whether the object is in the dangerous situation, based on the object data.

The processor is further configured to execute the one or more instructions to receive the object situation of the object, the object situation being determined by an external server, from the external server through the communicator.

According to an embodiment, there is provided a method of assisting autonomous driving of a vehicle, the method including: obtaining object data of an object located in a driving environment of the vehicle; based on determining that the object is incapable of communicating with the vehicle, obtaining an object situation of the object, the object situation being determined based on the object data; determining whether the object situation is a dangerous situation; based on determining the object situation, determining a message type for notifying at least one of the object data and the object situation to the vehicle; and transmitting a message generated according to the determined message type through a communicator.

The transmitting the message further includes, based on determining that the object situation is the dangerous situation, generating an emergency message including information about the dangerous situation and transmitting the emergency message to the vehicle.

The method further includes determining a transmission time point for transmitting the emergency message based on a degree of danger of the dangerous situation.

The method of further includes determining a number of times to transmit the emergency message, based on a degree of danger of the dangerous situation.

The method further includes determining a communication channel among a plurality of communication channels through which the emergency message is to be transmitted, based on a degree of danger of the dangerous situation.

The transmitting the message further includes, based on determining that the object situation is not the dangerous situation, generating a default message and transmitting the default message based on a pre-set cycle.

The method further includes determining whether the object is capable of communicating with the vehicle, based on at least one of the obtained object data or identification information of the object, the identification information being transmitted from the object.

According to an embodiment, there is provided a non-transitory computer-readable recording medium storing a program including executable instructions, which when executed by a processor, cause the processor to perform a method of assisting autonomous driving of a vehicle. The method includes: obtaining object data of an object located in a driving environment of the vehicle; based on determining that the object is incapable of communicating with the vehicle, obtaining an object situation of the object, the object situation being determined based on the object data; determining whether the object situation is a dangerous situation; based on determining the object situation, determining a message type for notifying at least one of the object data and the object situation to the vehicle; and transmitting a message generated according to the determined message type through a communicator.

The driving environment is determined based on a predetermined distance from the vehicle.

The communicator is configured to exchange data based on V2X communication.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The terms used in the disclosure are selected from among common terms that are currently widely used in consideration of their functions in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in the corresponding part of the detailed description. Therefore, the terms used in the disclosure are not merely designations of the terms, but the terms are defined based on the meaning of the terms and content throughout the disclosure.

Throughout the disclosure, when a part "includes" an element, it may be understood that the part additionally includes other elements rather than excluding other elements, unless indicated otherwise. Also, the terms, such as "unit," "module," etc., denote a unit processing at least one function or operation, which may be implemented as hardware or software or a combination thereof.

Hereinafter, embodiments of the disclosure will be described with reference to the accompanying drawings for one of ordinary skill in the art to be able to perform the disclosure. The disclosure may, however, be embodied in many different forms and should not be construed as being limited to the embodiments of the disclosure set forth herein.

The expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

Figure 1:
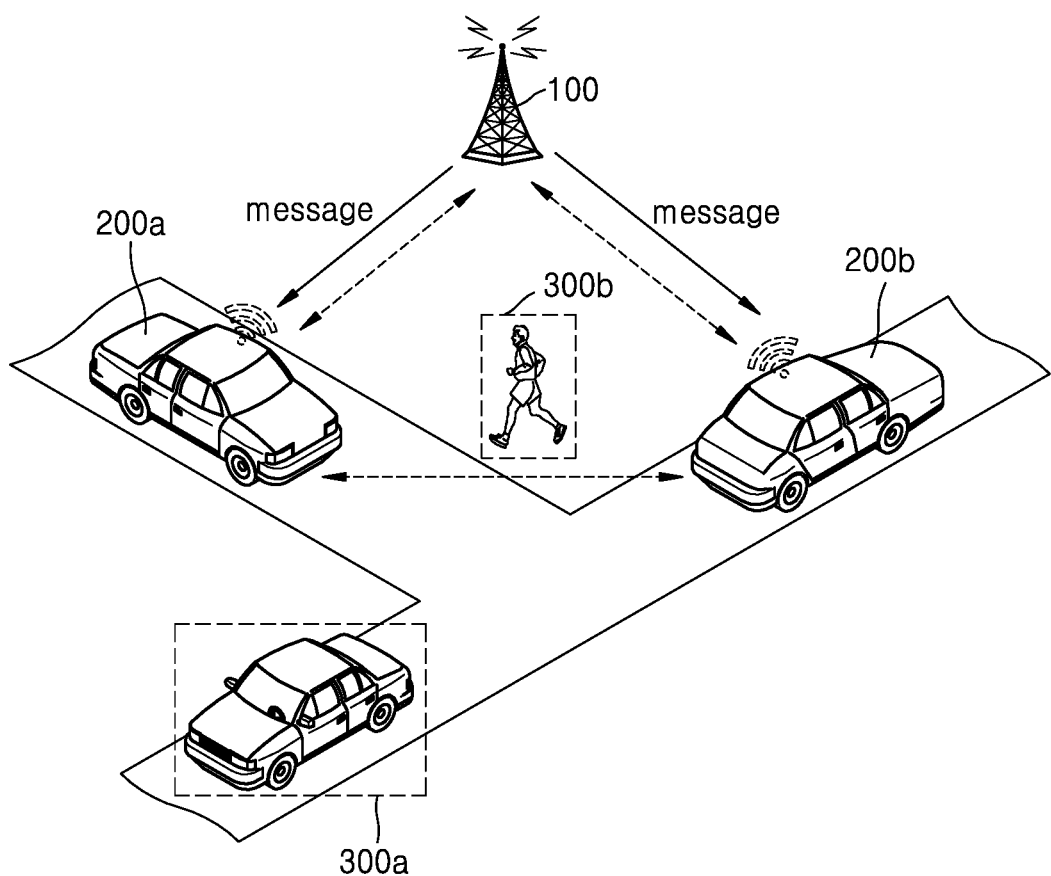
FIG. 1 is a schematic view illustrating an example of an operation of an electronic device for assisting with driving of a vehicle according to an embodiment.

FIG. 1 is a schematic view illustrating an example of an operation of an electronic device for assisting with driving of a vehicle according to an embodiment.

The electronic device 100 may include a device for assisting with or controlling a driving operation of a vehicle. The electronic device 100 may be located around a road on which the vehicle drives. The electronic device 100 may be loaded in road infrastructure, such as traffic lights, traffic centers, closed-circuit televisions (CCTVs), etc. and may assist with or control a driving operation of an autonomous vehicle or a vehicle capable of autonomously controlling part of a driving operation.

Vehicle-to-everything (V2X) communication refers to a communication function between a vehicle and an object, whereby the vehicle may exchange information with the object, such as other vehicles, mobile devices, roads, etc. through wired or wireless networks.

For example, a vehicle having the V2X communication function may transmit and receive data to and from the electronic device 100 through V2X communication. Also, the vehicle having the V2X communication function may transmit and receive data to and from another vehicle also having the V2X communication function.

Referring to FIG. 1, a first vehicle 200a and a second vehicle 200b are capable of being connected with a peripheral object in a network, and transmitting and receiving data to and from the peripheral object through the V2X communication. Thus, data exchange between the first vehicle 200a and the second vehicle 200b may be possible. Also, data exchange among the first vehicle 200a, the second vehicle 200b, and the electronic device 100 may be possible.

However, there may be a third vehicle 300a, which may not include a V2X communication function. Here, the third vehicle 300a and a pedestrian 300b may be incapable of communication with the first vehicle 200a, the second vehicle 200b and the electronic device 100.

An object may mean an object that is sensed as being located in a driving environment. For example, an object may include a vehicle, a pedestrian, an obstacle on a driving path, etc., but is not limited thereto. Here, a driving environment may mean any interrelationship between objects. For example, a driving environment of the first vehicle 200a may include the pedestrian 300b running at 6 mph, in a certain direction represented in a coordinate system, at 10m away from the first vehicle 200a. Also, a driving environment may be set based on a predetermined distance from a target object. For example, assuming that a predetermined distance is 100m, the driving environment may include any objects within a radius of 100m from a target object or the vehicle. However, this is merely an example, and there may be other features and characteristics associated with the driving environment.

The electronic device 100 may include various sensors that may detect an object in a driving environment of a vehicle. Also, the electronic device 100 may receive a sensing result generated by an external server or a device.

Figure 17:
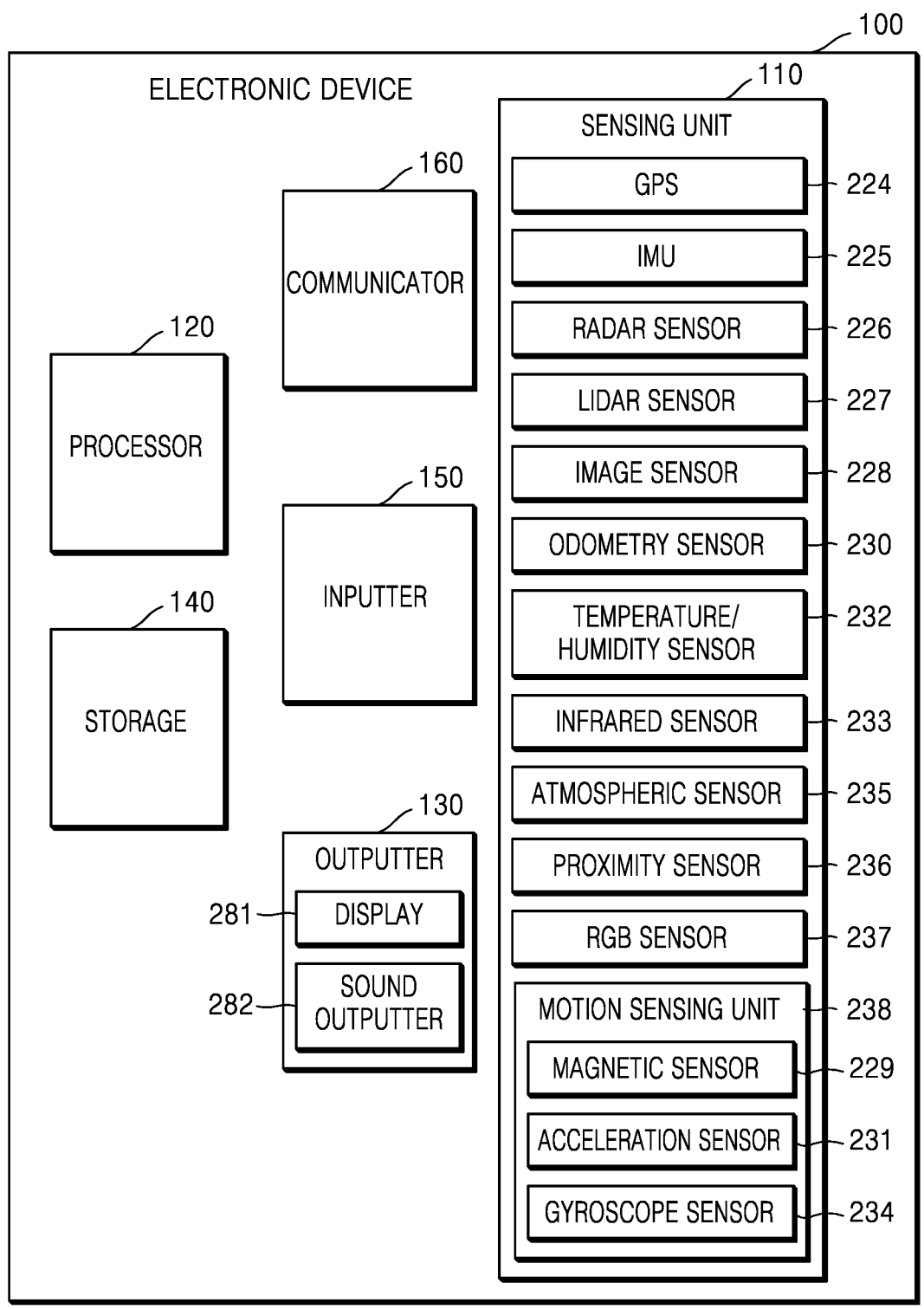
FIG. 17 is a detailed block diagram of an electronic device according to an embodiment.

Referring to FIG. 1, the electronic device 100 may sense an object, for example, the third vehicle 300a and the pedestrian 300b, by using at least one sensor 110 (shown in FIG. 17).

The electronic device 100 may provide information about the third vehicle 300a and the pedestrian 300b, which are incapable of performing V2X communication, to the first vehicle 200a and the second vehicle 200b, which are capable of performing V2X communication. For example, the electronic device 100 may generate and transmit an emergency message including information on a dangerous situation, based on whether a situation (for example, position and moving direction) of the third vehicle 300a and the pedestrian 300b in the driving environment pose a dangerous situation (for example, a danger of collision of a vehicle and a pedestrian).

Accordingly, the first vehicle 200a and the second vehicle 200b may perform accurate autonomous driving taking into account a peripheral driving environment, based on the emergency message received from the electronic device 100.

In addition, the electronic device 100 may be installed or loaded in the road infrastructure, such as traffic lights, traffic centers, CCTVs, etc., and may sense objects on the road at a high altitude to cover a broad range of area. Thus, the accuracy of detecting objects may be increased.

Also, the electronic device 100 operating in the road infrastructure may comprehensively determine situations of a plurality of objects within a sensing range, and thus, may accurately and quickly predict a danger of collision of the plurality of objects and avoid a dangerous situation, thereby providing a safe driving environment.

Also, the electronic device 100 operating in the road infrastructure to perform complex calculations required for a driving control operation may provide a relatively quicker and more accurate control operation.

The operations of the electronic device 100 will be described in more detail with reference to the accompanying drawings herein below.

Figure 2:
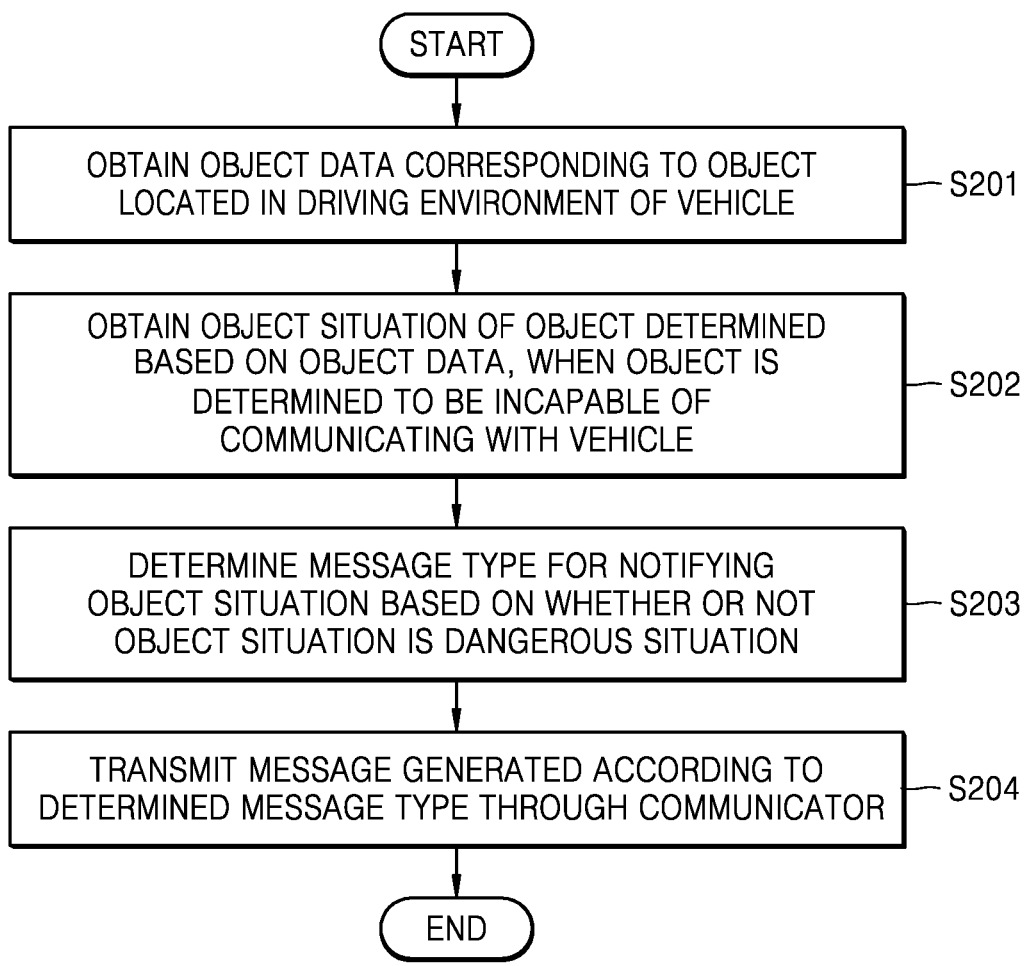
FIG. 2 is a flowchart of an operating method of an electronic device according to an embodiment.

FIG. 2 is a flowchart of an operating method of the electronic device 100, according to an embodiment.

In operation S201, the electronic device 100 may obtain object data corresponding to an object located in a driving environment of a vehicle.

The electronic device 100 may generate the object data by sensing the object. Also, the electronic device 100 may receive the object data from an external server.

The object data may include information about driving or moving of an object. For example, the object data may include a time point at which an object is sensed, a location of the object, a moving speed of the object, a moving direction of the object, an expected moving path of the object, and a relative distance between the object and another object. However, the object data is not limited thereto.

In operation S202, when the object is determined to be incapable of communicating with the vehicle, the electronic device 100 may obtain an object situation of the object, the object situation being determined based on the object data.

According to an embodiment, based on whether the object is capable or incapable of communicating with the vehicle, the electronic device 100 may provide information about the object incapable of communicating with the vehicle to the autonomous driving vehicle.

For example, the electronic device 100 may determine whether the object is capable or incapable of communicating with the vehicle, based on at least one of identification information of the object, the identification information being transmitted from the object, or the obtained object data.

Also, the electronic device 100 may analyze whether the object situation is a dangerous situation (for example, a danger of collision with the vehicle, a danger of collision with a pedestrian, a danger of collision with an obstacle on a driving road, etc.) based on the object data. In addition, the electronic device 100 may receive the object situation determined based on the object data, from an external server.

In operation S203, the electronic device 100 may determine a message type for notifying about the object situation, based on whether or not the object situation is a dangerous situation. In operation S204, the electronic device 100 may transmit a message generated according to the determined message type through a communicator 160 (shown in FIG. 16).

According to an embodiment, for exchange of information between devices capable of V2X communication, a cooperative awareness message (CAM) and a decentralized environmental notification message (DENM) may be used.

When it is determined that the object situation is a dangerous situation, the electronic device 100 may generate an emergency message including information about the dangerous situation and transmit the emergency message to the vehicle.

For example, the electronic device 100 may generate and transmit a DENM packet. The DENM packet may be generated by recognizing a dangerous situation (for example, a danger of collision with a vehicle, a danger of collision with a pedestrian, a danger of collision with an obstacle on a driving road, etc.).

The DENM packet may include information about the dangerous situation. For example, the DENM packet may include a still image and a video capturing a dangerous situation, and data about a degree of danger, but is not limited thereto.

Also, when it is determined that the object situation is not a dangerous situation, the electronic device 100 may generate a default message and transmit the default message.

For example, the electronic device 100 may generate and transmit a CAM packet. The electronic device 100 may generate and broadcast the CAM packet based on a pre-set cycle.

For example, the CAM packet may include information about a location, a moving speed, a moving direction, an expected moving path, etc. of an object that is sensed, but is not limited thereto.

Figure 3:
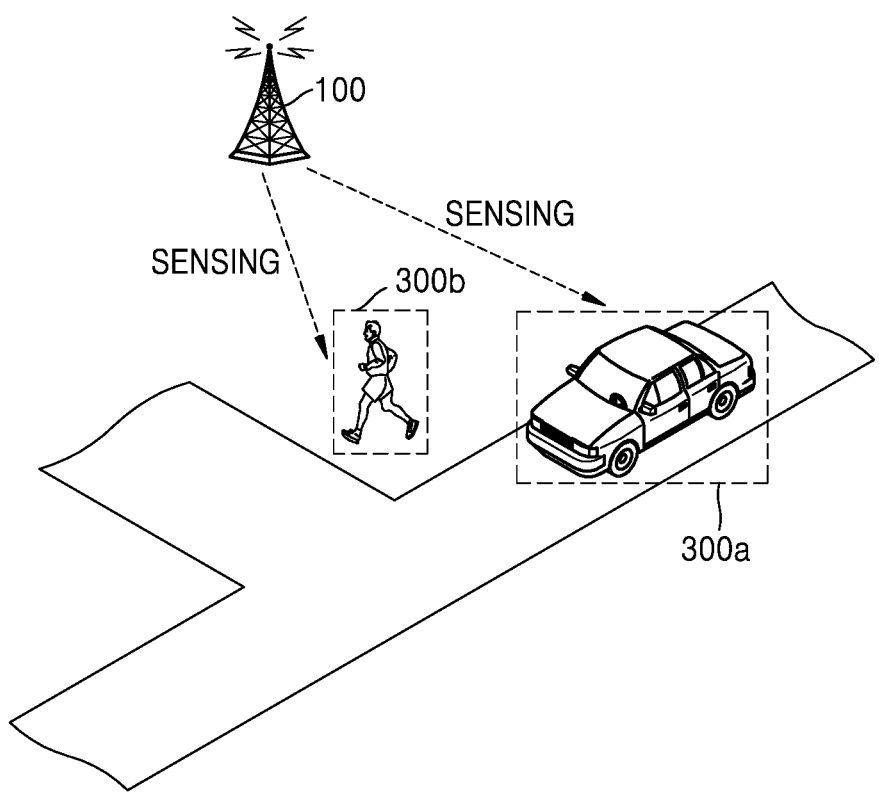
FIG. 3 is a schematic view illustrating an example of a method, performed by an electronic device, of obtaining object data according to an embodiment.
Figure 4:
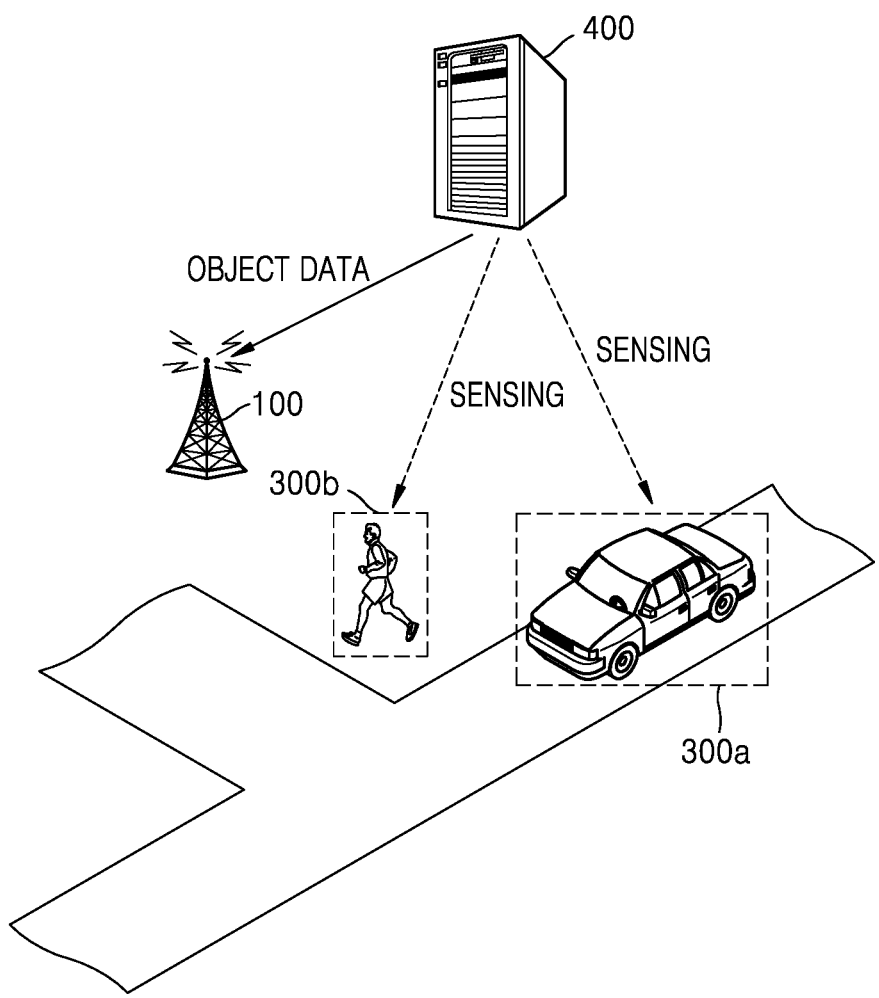
FIG. 4 is a schematic view illustrating another example of a method, performed by an electronic device, of obtaining object data according to an embodiment.

FIG. 3 is a schematic view illustrating an example of a method, performed by the electronic device 100, of obtaining object data, according to an embodiment. FIG. 4 is a schematic view illustrating another example of the method, performed by the electronic device 100, of obtaining the object data, according to an embodiment.

Here, the electronic device 100 may obtain object data corresponding to an object located in a driving environment of a vehicle.

Referring to FIG. 3, the electronic device 100 may include a sensing unit 110 (shown in FIG. 17) including at least one sensor. The electronic device 100 may detect an object by using the at least one sensor. Based on the detection of an object using at least one sensor, the electronic device 100 may generate the object data.

The object data may include information about driving or moving of an object. The object data may include a time point at which an object is sensed, a location of the object, a moving speed of the object, a moving direction of the object, an expected moving path of the object, etc., but is not limited thereto.

For example, the electronic device 100 may generate the object data based on a result of sensing the third vehicle 300a and the pedestrian 300b.

The electronic device 100 may sense an object around the electronic device 100, for example, another driving vehicle, a pedestrian, an obstacle around a driving path, etc., by using a radar detection and ranging (RADAR) sensor 226 (shown in FIG. 17) and a light detection and ranging (LIDAR) sensor 227 (shown in FIG. 17).

The RADAR sensor 226 may be configured to sense objects in a driving environment by using a radio signal. Also, the RADAR sensor 226 may be configured to sense speeds and/or directions of objects.

The LIDAR sensor 227 may sense a shape, a distance, a topographical feature, etc. of a peripheral object by outputting a laser beam by using a laser and obtaining a reflection signal from the object by using at least one laser receiver.

Also, the electronic device 100 may capture an environment around the electronic device 100 by using an image sensor 228 (shown in FIG. 17) and track an object in the captured environment.

The image sensor 228 may include a still camera or a video camera configured to record an environment outside the electronic device 100. For example, the image sensor 228 may include a plurality of cameras and the plurality of cameras may be arranged in a plurality of locations inside and outside of the electronic device 100.

FIG. 4 is a schematic view illustrating another example of the method, performed by the electronic device 100, of obtaining the object data, according to an embodiment.

According to an embodiment, the electronic device 100 may receive the object data from an external server 400.

The external server 400 may include at least one sensor described as the sensing unit 110 of the electronic device 100 in FIG. 17. Further, the external server 400 may sense an object, for example, a driving vehicle, a pedestrian, an obstacle around a driving path, etc., by using the RADAR sensor 226, the LIDAR sensor 227, and the image sensor 228.

Referring to FIG. 4, the external server 400 may sense the vehicle 300a and the pedestrian 300b by using the sensing unit 110. The external server 400 may generate the object data based on the sensed object and transmit the object data to the electronic device 100.

Figure 5:
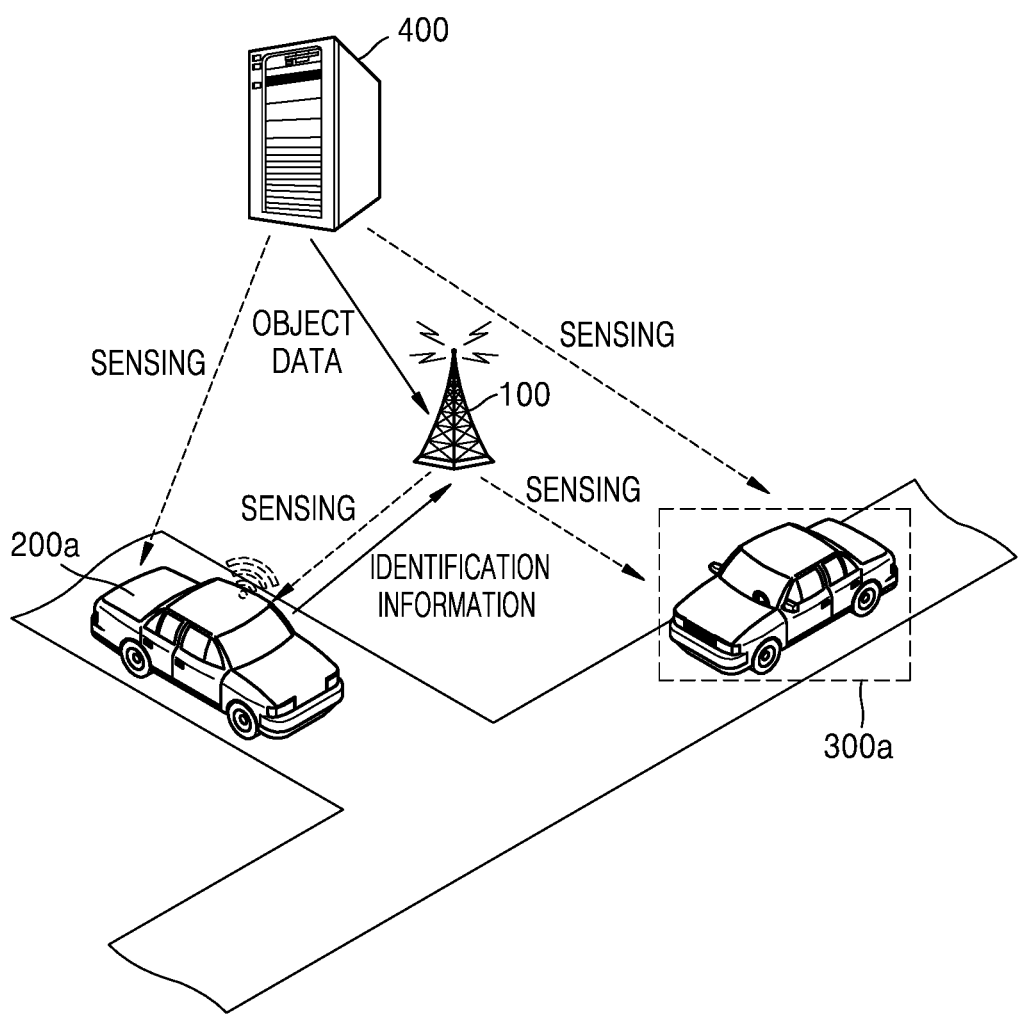
FIG. 5 is a schematic view illustrating an example of a method, performed by an electronic device, of determining whether an object is an object capable of communicating with a vehicle or an object incapable of communicating with a vehicle according to an embodiment.
Figure 6:
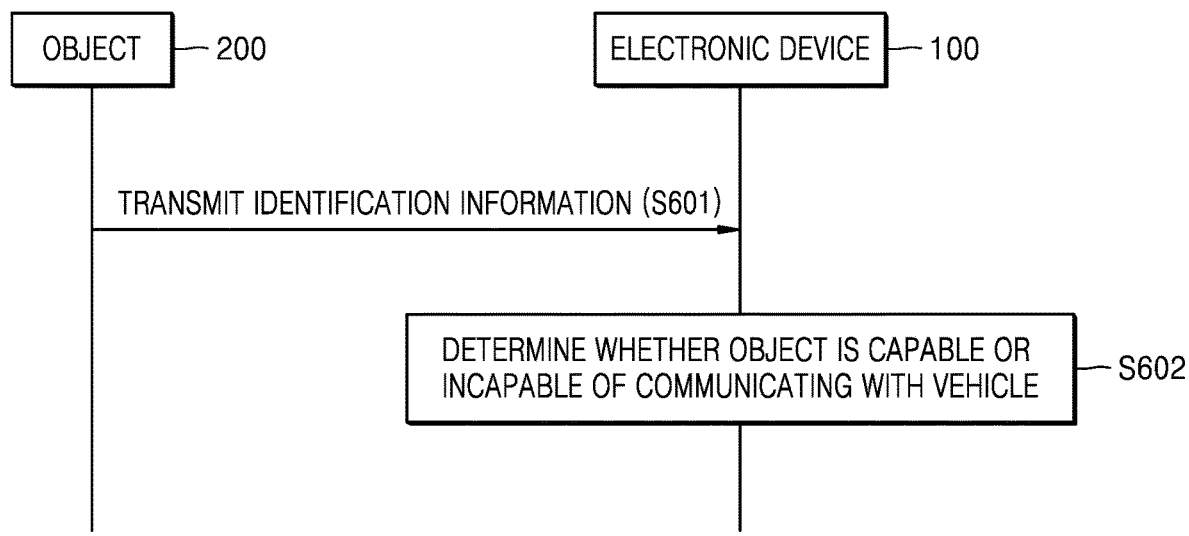
FIG. 6 is a flowchart of a method, performed by an electronic device, of determining whether an object is an object capable of communicating with a vehicle according to an embodiment.
Figure 7:
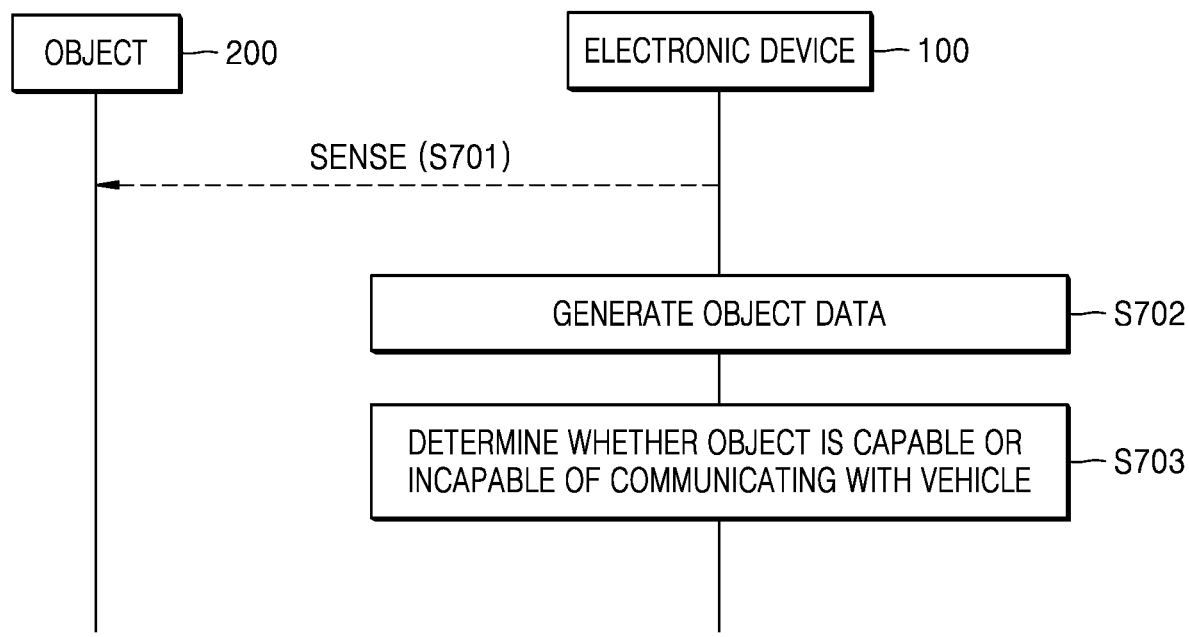
FIG. 7 is a flowchart of a method, performed by an electronic device, of determining whether an object is an object capable of communicating with a vehicle according to another embodiment.
Figure 8:
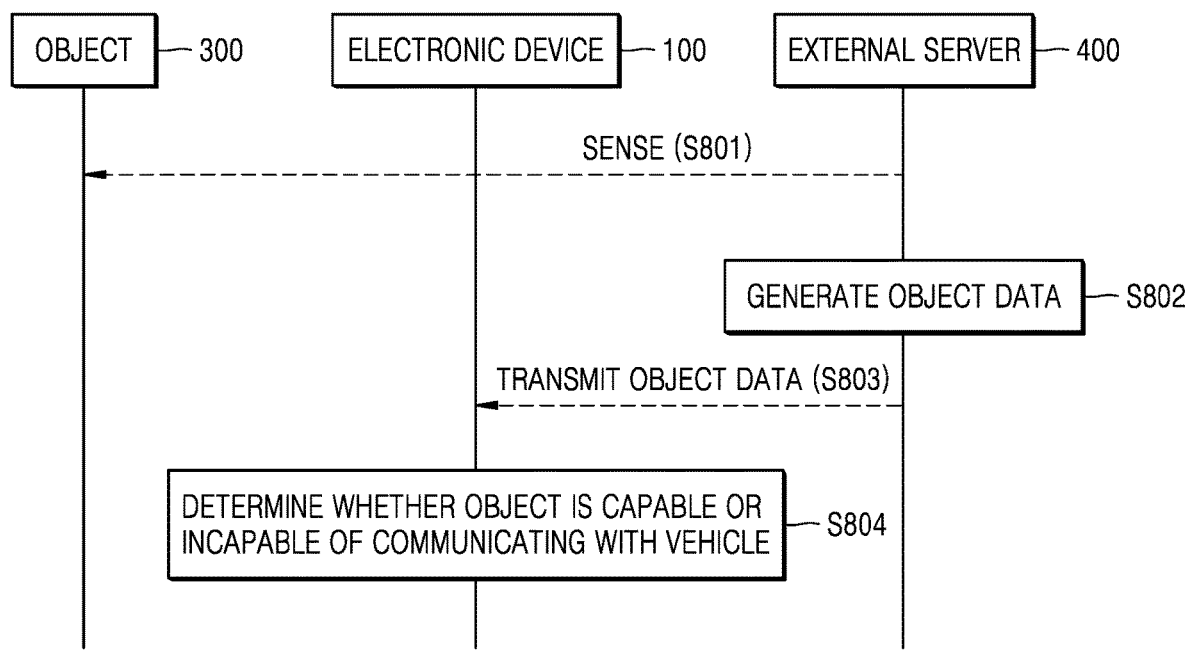
FIG. 8 is a flowchart of a method, performed by an electronic device, of determining whether an object is an object capable of communicating with a vehicle according to another embodiment.

FIG. 5 is a schematic view illustrating an example of a method, performed by the electronic device 100, of determining whether an object is capable of communicating with a vehicle, according to an embodiment; FIG. 6 is a flowchart of a method, performed by the electronic device 100, of determining whether an object is capable of communicating with a vehicle, according to an embodiment; FIG. 7 is a flowchart of a method, performed by the electronic device 100, of determining whether the object is capable of communicating with the vehicle, according to another embodiment; FIG. 8 is a flowchart of a method, performed by the electronic device 100, of determining whether the object is capable of communicating with the vehicle, according to another embodiment.

According to an embodiment, the electronic device 100 may determine whether the object is capable or incapable of communicating with the vehicle, based on at least one of identification information indicating the object, the identification information being transmitted from the object, or object data.

Referring to FIG. 5, the first vehicle 200a may broadcast identification information of the first vehicle 200a to the electronic device 100. Accordingly, the electronic device 100 may receive the identification information of the first vehicle 200a. The electronic device 100 may determine that the first vehicle 200a is capable of V2X communication, based on the identification information received from the first vehicle 200a.

The identification information may include information for identifying an object from another object. The identification information may include a communication identification, a number of a vehicle, a current location of the vehicle, a driving speed of the vehicle, a driving direction of the vehicle, etc., but is not limited thereto.

Referring to FIG. 6, in operation S601, an object 200 may transmit identification information to the electronic device 100. For example, a vehicle capable of V2X communication may broadcast identification information thereof according to a pre-set cycle (for example, 5 ms).

In operation S602 of FIG. 6, the electronic device 100 may determine whether the object 200 is capable or incapable of communicating with the vehicle. Here, the electronic device 100 may determine that the object 200 is capable of communicating with the vehicle, based on the identification information received from the object 200 in operation S601.

Also, referring back to FIG. 5, the electronic device 100 may obtain the object data, which include information about the object. The electronic device 100 may obtain the object data by sensing the first vehicle 200a and the third vehicle 300a using the sensing unit 110 or may obtain the object data from the external server 400 which may separately obtain object data of objects based on sensors included in the external server 400.

Referring to FIG. 7, in operation S701, the electronic device 100 may sense an object 200. For example, the electronic device 100 may sense the third vehicle 300a by using the sensing unit 110.

In operation S702, the electronic device 100 may generate the object data based on data of the sensed object 300. Specifically, the electronic device 100 may sense the third vehicle 300a and generate the object data based on a result of the sensing. For example, the object data may include a speed, a direction, a location of the third vehicle 300a, etc. However, object data is not limited thereto, and may include other features that may be detected by the sensing unit 110 of the electronic device 100.

In addition, as described above, the electronic device 100 may sense the first vehicle 200a and a third vehicle 300a. For example, the electronic device 100 may generate the object data of the sensed first vehicle 200a and the third vehicle 300a including respective driving speeds, driving directions, and expected driving paths for each vehicle, based on a result of the sensing.

In operation S703, the electronic device 100 may determine whether the object is capable or incapable of communicating with the vehicle. The electronic device 100 may determine whether the object is capable of communicating with the vehicle, based on the object data generated in operation S702. For example, the electronic device 100 may determine that the third vehicle 300a is incapable of communicating with another vehicle based on the object data of the third vehicle 300a.

Also, as described above, the electronic device 100 may receive, via the external server 400, the object data generated based on a result of sensing the first vehicle 200a and the third vehicle 300a.

Referring to FIG. 8, in operation S801, the external server 400 may sense an object 300.

According to an embodiment, the external server 400 may include at least one sensor similar to the sensing unit 110 of the electronic device 100 (shown in FIG. 17). Therefore, the external server 400 may also sense the object by using the least one sensor.

In operation S802, the external server 400 may generate the object data based on data of the sensed object in operation S801.

In operation S803, the external server 400 may transmit the object data to the electronic device 100 and the electronic device 100 may receive the object data from the external server 400.

In operation S804, the electronic device 100 may determine whether the object 300 is capable or incapable of communicating with a vehicle based on identification information of the object 300. For example, the electronic device 100 may determine that the sensed object is incapable of communicating with the vehicle, if the identification information of the object 300 indicates that it does not support the V2X communication. Alternatively, the electronic device 100 may determine that the object 300 is capable of communicating with the vehicle if the identification information of the object 300 indicates that it supports the V2X communication.

For example, referring to FIG. 5, the electronic device 100 may determine that the third vehicle 300a is incapable of communicating with another vehicle, based on the identification information of the vehicle 300a, the identification information being received from the external server 400. Here, the identification information may also be included as part of the generated object data.

Figure 9:
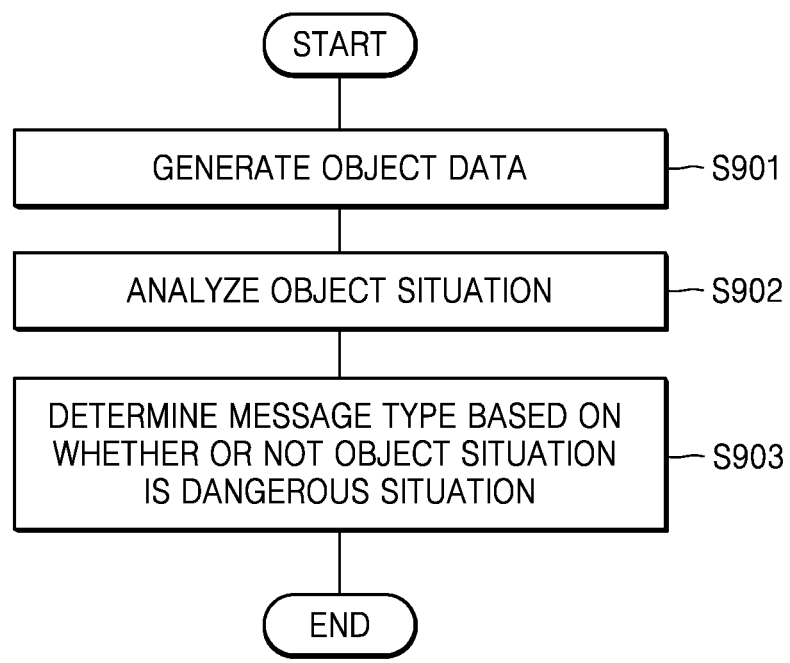
FIG. 9 is a flowchart of an example in which an electronic device generates object data and analyzes an object situation according to an embodiment.

FIG. 9 is a flowchart of an example in which the electronic device 100 generates object data and analyzes an object situation, according to an embodiment.

According to an embodiment, the electronic device 100 may generate the object data and analyze the generated object data to determine the object situation.

In operation S901, the electronic device 100 may generate the object data. According to an embodiment, the electronic device 100 may sense an object by using the sensing unit 110 and generate the object data based on a result of the sensing.

In operation S902, the electronic device 100 may analyze the object situation. That is, the electronic device 100 may analyze whether the object is in a dangerous situation based on the object data.

In operation S903, the electronic device 100 may determine a message type based on whether or not the object situation is the dangerous situation. When it is determined that the object situation is the dangerous situation, the electronic device 100 may generate an emergency message including information on the dangerous situation.

Also, when it is determined that the object situation is not the dangerous situation, the electronic device 100 may generate a default message and transmit the default message according to a pre-set cycle.

Figure 10:
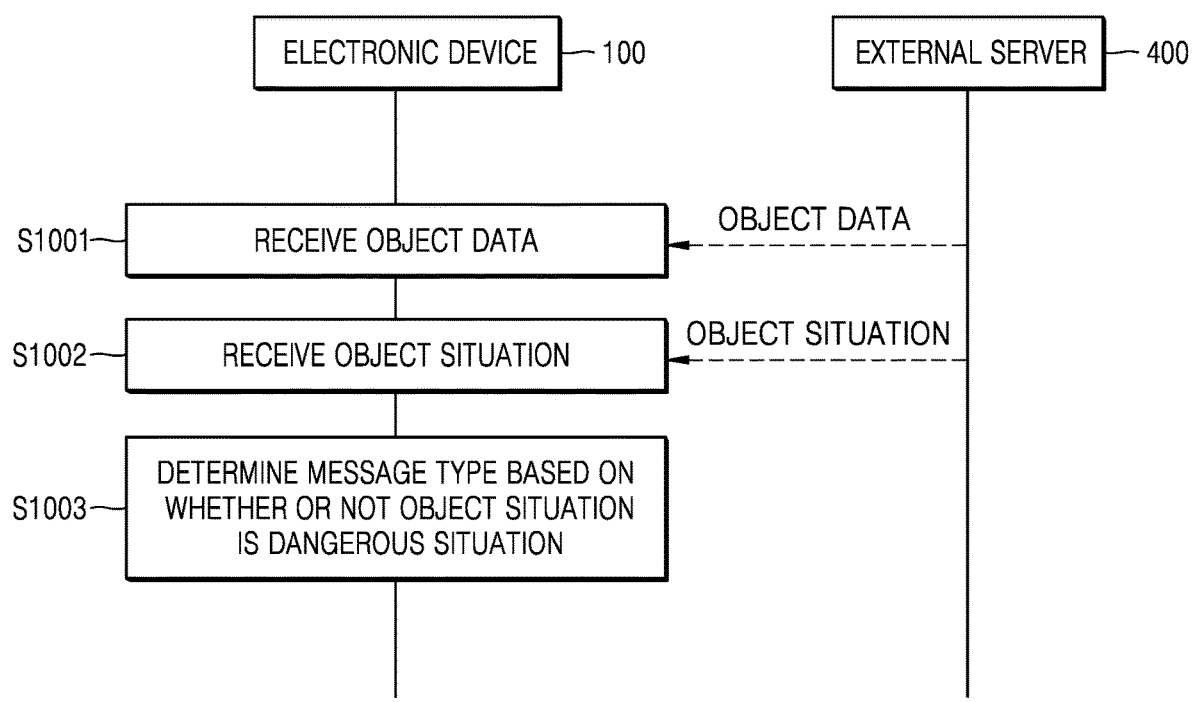
FIG. 10 is a flowchart of an example in which an electronic device receives object data and an object situation from an external server according to an embodiment.

FIG. 10 is a flowchart of an example in which the electronic device 100 receives object data and an object situation from the external server 400 according to an embodiment.

Referring to FIG. 10, in operation S1001, the electronic device 100 may receive the object data from the external server 400. In operation S1002, the electronic device 100 may receive the object situation from the external server 400. That is, the external server 400 may analyze object situation upon receiving object data from an object and transmit the object data and the object situation to the electronic device 100.

In operation S1003, the electronic device 100 may determine a message type based on whether or not the object situation received from the external server 400 is a dangerous situation.

As described above, when it is determined that the object situation received from the external server 400 is the dangerous situation, the electronic device 100 may generate an emergency message including information on the dangerous situation. Also, when it is determined that the object situation is not the dangerous situation, the electronic device 100 may generate a default message and transmit the default message according to a pre-set cycle.

Figure 11:
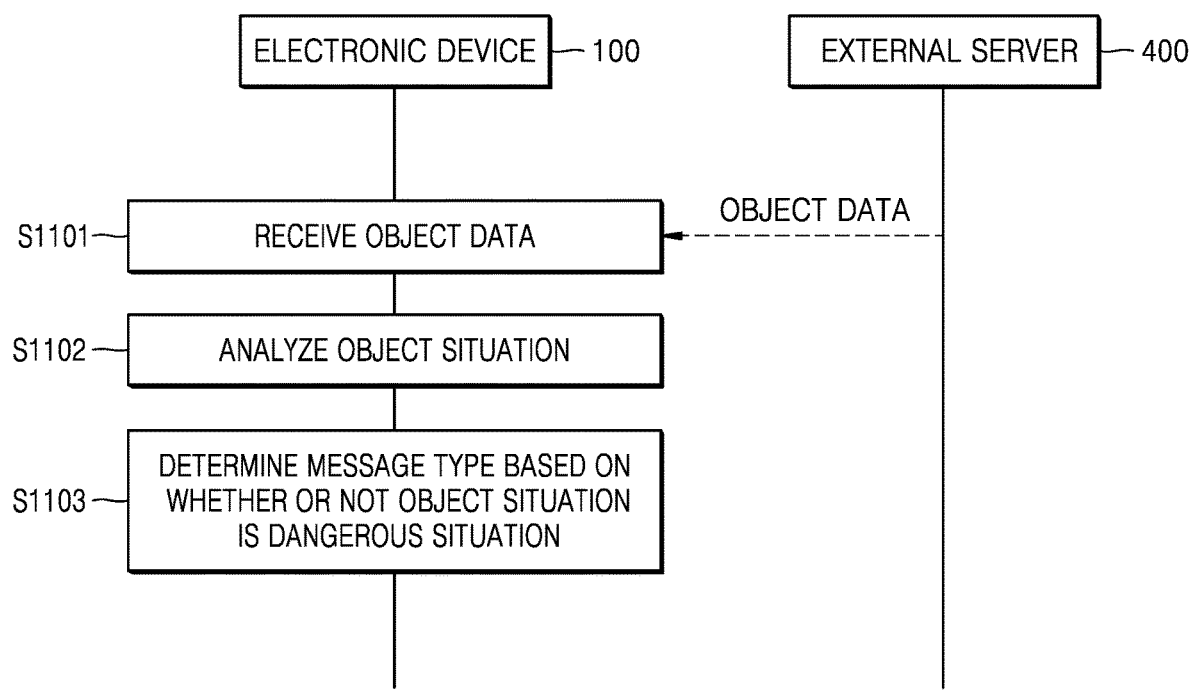
FIG. 11 is a flowchart of an example in which an electronic device receives object data from an external server and analyzes an object situation according to an embodiment.

FIG. 11 is a flowchart of an example in which the electronic device 100 receives object data from the external server 400 and analyzes an object situation, according to an embodiment.

Referring to FIG. 11, in operation S1101, the electronic device 100 may receive the object data from the external server 400. In operation S1102, the electronic device 100 may analyze the object situation based on the object data received from the external server 400.

In operation S1103, the electronic device 100 may determine a message type based on whether or not the object situation is the dangerous situation.

Figure 12:
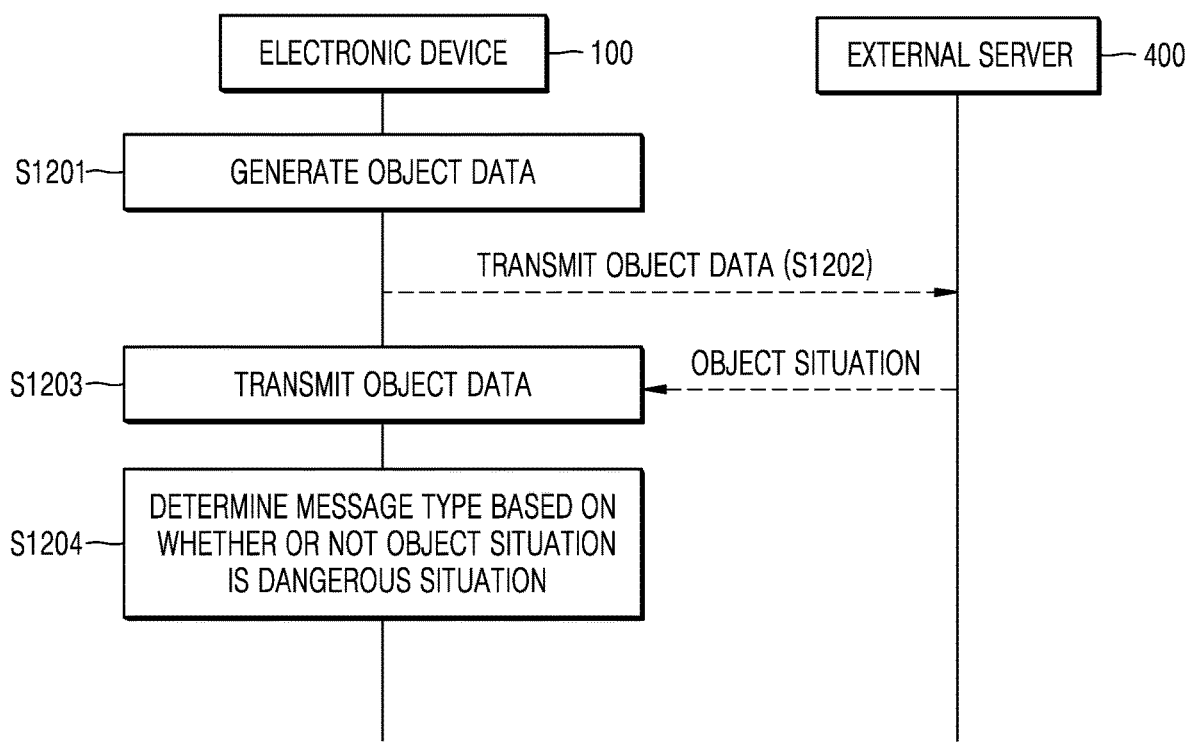
FIG. 12 is a flowchart of an example in which an electronic device generates object data and receives an object situation from an external server, according to an embodiment.

FIG. 12 is a flowchart of an example in which the electronic device 100 generates object data and receives an object situation from the external server 400, according to an embodiment.

Referring to FIG. 12, in operation S1201, the electronic device 100 may generate the object data. Here, the electronic device 100 may sense an object by using the sensing unit 110 and generate the object data based on a result of the sensing.

In operation S1202, the electronic device 100 may transmit the object data to the external server 400. In operation S1203, the electronic device 100 may receive the object situation from the external server 400. According to an embodiment, the external server 400 may analyze the object situation based on the object data received from the electronic device 100 and transmit the analyzed object situation to the electronic device 100.

In operation S1204, the electronic device 100 may determine a message type based on whether or not the object situation is a dangerous situation.

FIGS. 9 through 12 illustrate various embodiments. However, the disclosure is not limited thereto.

Figure 13:
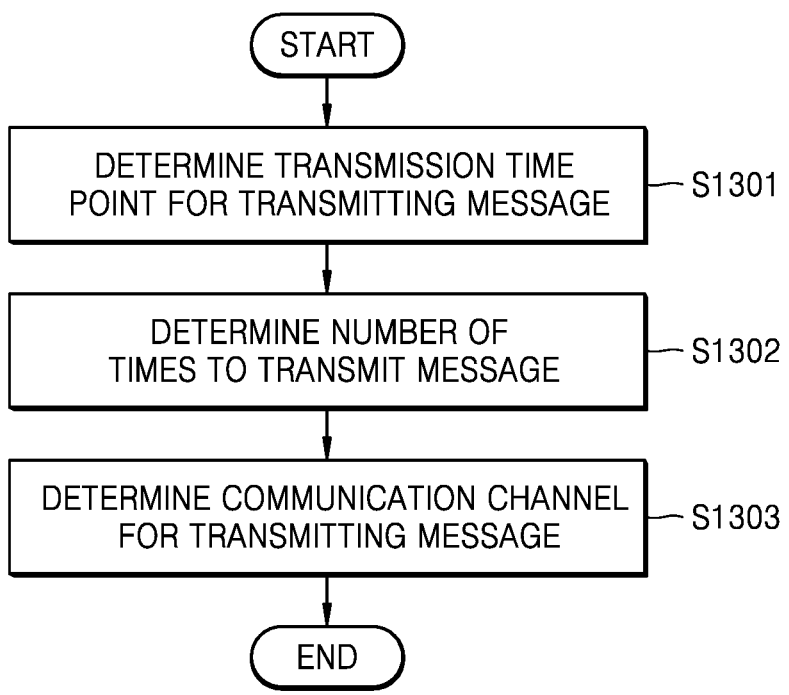
FIG. 13 is a flowchart of a method, performed by an electronic device, of transmitting a message according to an embodiment.

FIG. 13 is a flowchart of an example of a method, performed by the electronic device 100, of transmitting a message, according to an embodiment.

Referring to FIG. 13, in operation S1301, the electronic device 100 may determine a transmission time point for transmitting the message.

According to an embodiment, when the electronic device 100 determines a message type as an emergency message, the electronic device 100 may generate and transmit the emergency message without delay.

Alternatively, when the electronic device 100 determines the message type as a general message, the electronic device 100 may generate and transmit the general message based on a pre-set cycle. For example, the electronic device 100 may generate and transmit the general message after standing by for a pre-set time period (for example, 100 ms).

In operation S1302, the electronic device 100 may determine the number of times to transmit the message.

That is, the electronic device 100 may determine the number of times to transmit the message according to a degree of danger of a dangerous situation of an object. The electronic device 100 may increase the number of times to transmit the message, as the degree of risk is higher. For example, when it is requires an immediate attention of the driver to avoid a collision, a plurality of emergency messages may be generated and transmitted to the object at a predetermined cycle, the predetermined cycle being relatively shorter in time frame. Furthermore, when the degree of danger of a situation increases, the number of times to transmit an identical message may also be increased to repeatedly notify the object about the urgent situation.

In operation S1303, the electronic device 100 may determine a communication channel for transmitting the message.

That is, the electronic device 100 may search for an optimum channel for quickly transmitting the message and may transmit the message by using the optimum channel. For example, the electronic device 100 may transmit the message by using a channel having the lowest interference and noise signals. In other words, the electronic device 100 may identify a channel with the highest transmission rate for messages and transmit the messages through the identified channel. In addition, the electronic device 100 may use a plurality of channels to quickly transmit the messages as separate packets.

Furthermore, the electronic device 100 may determine a priority order with respect to channel selection according to the degree of danger of the dangerous situation of the object. For example, as the degree of danger of the dangerous situation of the object increases, the electronic device 100 may transmit the emergency message by selecting a channel having a high stability with the lowest interference and noise signals.

FIG. 13 is merely an example of an embodiment. However, the disclosure is not limited thereto.

Figure 14:
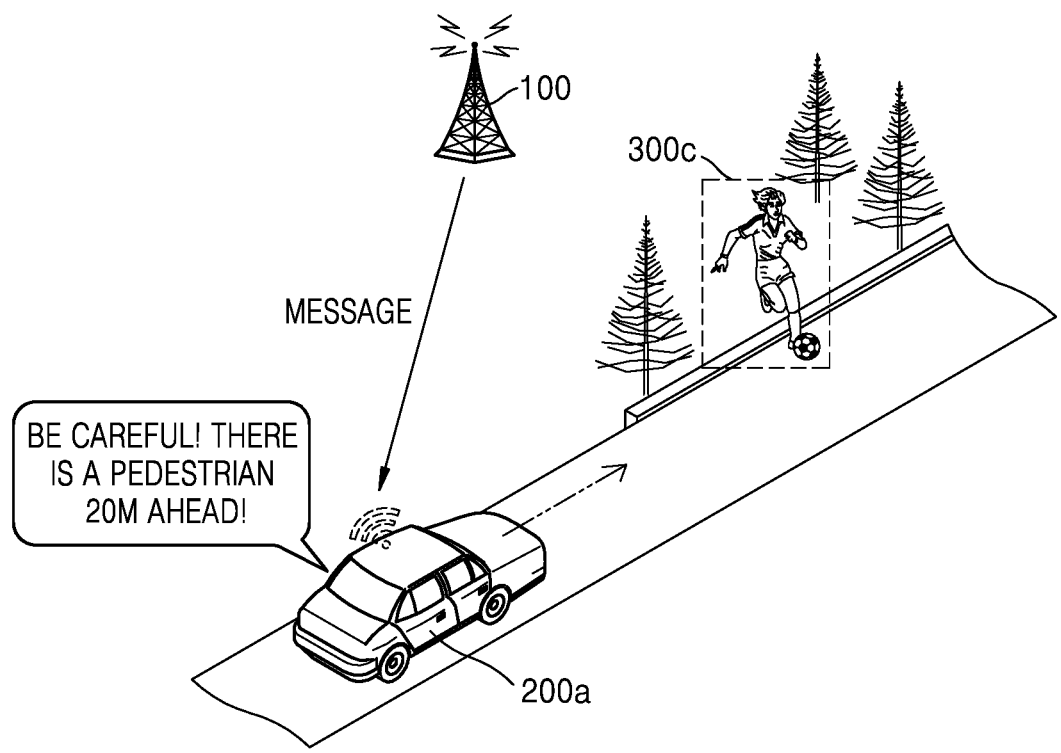
FIG. 14 is a schematic view illustrating an example in which an electronic device transmits an emergency message according to an embodiment.

FIG. 14 is a schematic view illustrating an example in which the electronic device 100 transmits an emergency message according to an embodiment.

According to an embodiment, the first vehicle 200a may control a driving operation of the first vehicle 200a based on a message received from the electronic device 100.

For example, the first vehicle 200a may control a driving operation (for example, a sudden stop, a change of direction, etc.) when the first vehicle 200a receives an emergency message, from the electronic device 100, that a dangerous situation is expected because a pedestrian 300c suddenly enters into the front road. Accordingly, the first vehicle 200a may control its driving operation to make a sudden stop to safely drive by the pedestrian 300c suddenly entering the road in front of the first vehicle 200a.

Also, the first vehicle 200a may provide a warning message to notify a driver of the first vehicle 200a about a dangerous situation. For example, the first vehicle 200a may output a message, such as "Be careful!, there is a pedestrian 20m ahead" via audio message. Also, the first vehicle 200a may output the message through a head up display (HUD), but the disclosure is not limited thereto.

Figure 15:
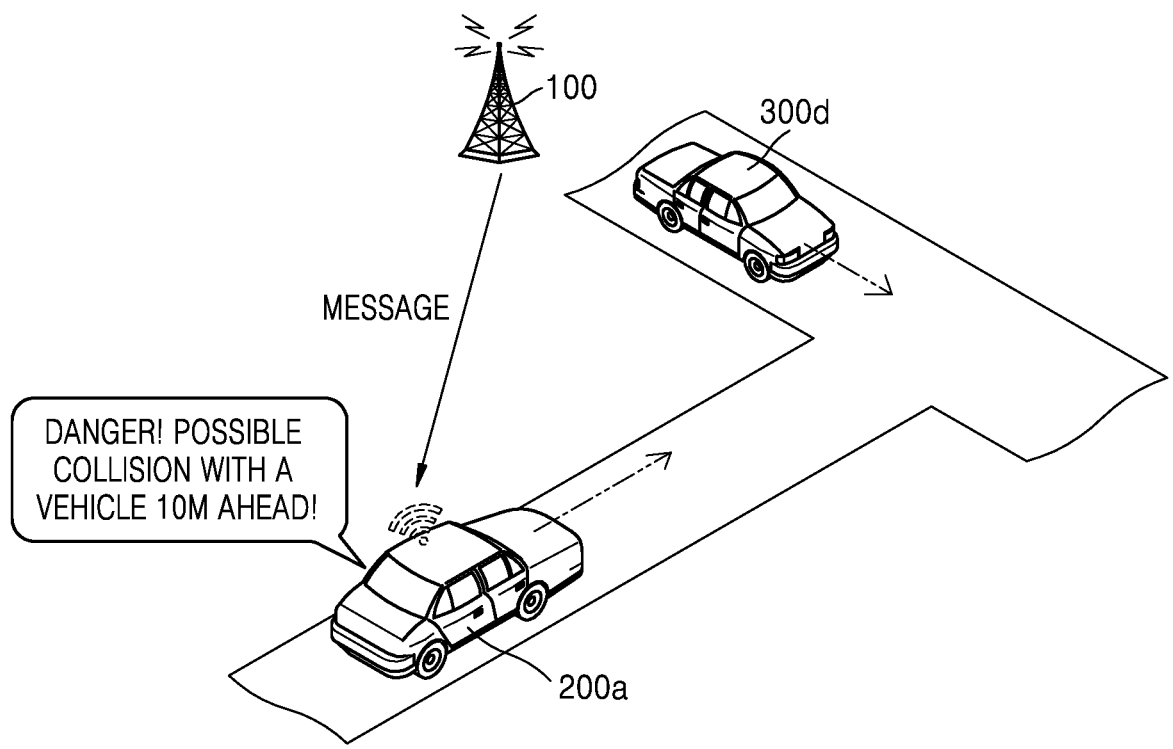
FIG. 15 is a schematic view illustrating another example in which an electronic device transmits an emergency message according to an embodiment.

FIG. 15 is a schematic view illustrating another example in which the electronic device 100 transmits an emergency message according to an embodiment.

For example, the electronic device 100 may sense a vehicle 300d speeding from the left side of a driving direction of the first vehicle 200a and notify the first vehicle 200a about a danger of collision with the vehicle 300d.

Based on a message indicating the object situation received from the electronic device 100, the first vehicle 200a may control a driving operation of the first vehicle 200a.

For example, when the first vehicle 200a receives an emergency message indicating a danger of collision with the vehicle 300d, the first vehicle 200a may control the driving operation (for example, deceleration, a change of lane, a change of direction, or the like) to avoid a collision. Thus, the dangerous situation may be prevented.

Also, the first vehicle 200a may provide a warning message to notify a driver about a dangerous situation. For example, the first vehicle 200a may output a message, such as "Danger! Possible collision with a vehicle 10 m ahead!" via audio. Also, the first vehicle 200a may output the message through an HUD, but the disclosure is not limited thereto.

FIGS. 14 and 15 merely illustrate examples of embodiments, and the disclosure is not limited thereto.

Figure 16:
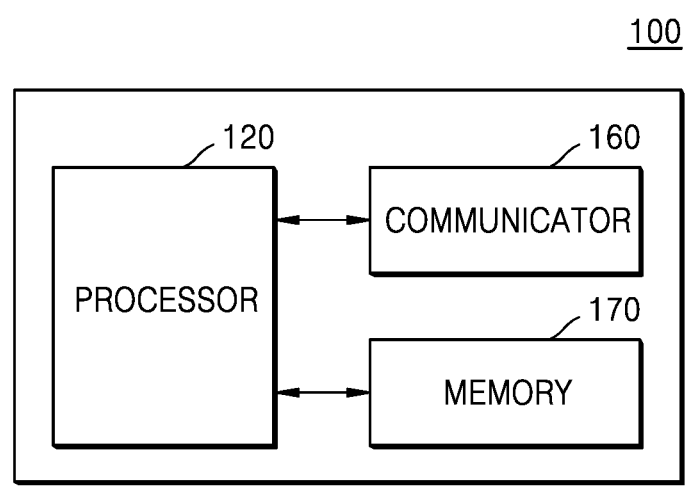
FIG. 16 is a block diagram of an electronic device according to an embodiment.

FIG. 16 is a block diagram of the electronic device 100 according to an embodiment.

The electronic device 100 may include a communicator 160, a memory 170, and a processor 120.

The processor 120 may include one or more processors. The processor 120 may execute one or more instructions to obtain object data corresponding to an object located in a driving environment of a vehicle. Also, the processor 120 may execute one or more instructions to obtain the object data by using at least one sensor.

In addition, the processor 120 may execute one or more instructions to receive the object data sensed by an external server from the external server 400 through the communicator 160.

When the object is determined to be incapable of communicating with the vehicle, the processor 120 may execute one or more instructions to obtain an object situation of the object, the object situation being determined based on the object data.

The processor 120 may execute one or more instructions to analyze the object situation about whether or not the object is in a dangerous situation, based on the object data. Also, the processor 120 may execute one or more instructions to receive the object situation determined by the external server from the external server 400 through the communicator 160.

Furthermore, the processor 120 may execute one or more instructions to determine whether the object is capable or incapable of communicating with the vehicle based on at least one of identification information indicating the object, the identification information being transmitted from the object, or the obtained object data.

Also, the processor 120 may execute one or more instructions to determine a message type to notify about the object situation, based on whether or not the object situation is the dangerous situation. Accordingly, the processor 120 may execute one or more instructions to transmit a message generated according to the determined message type through the communicator 160.

Also, the processor 120 may execute one or more instructions to generate an emergency message including information on the dangerous situation and transmit the emergency message, when it is determined that the object situation is a dangerous situation.

Alternatively, the processor 120 may execute one or more instructions to generate a default message and transmit the default message according to a pre-set cycle, when it is determined that the object situation is not a dangerous situation.

Also, the processor 120 may execute one or more instructions to determine a transmission time point for transmitting the message based on a degree of danger of the dangerous situation.

In addition, the processor 120 may execute one or more instructions to determine the number of times to transmit the message based on a degree of danger of the dangerous situation.

Also, the processor 120 may execute one or more instructions to determine a communication channel for transmitting the message based on a degree of danger of the dangerous situation.

FIG. 17 is a detailed block diagram of the electronic device 100 according to an embodiment.

The electronic device 100 may include the sensing unit 110, the processor 120, an outputter 130, a storage 140, an inputter 150, and the communicator 160.

The sensing unit 110 may include a plurality of sensors configured to sense information about a peripheral environment of an object and may include one or more actuators configured to change a location and/or alignment of the sensors. For example, the sensing unit 110 may include a global positioning system (GPS) 224, an inertial measurement unit (IMU) 225, the RADAR sensor 226, the LI DAR sensor 227, the image sensor 228, and an odometry sensor 230. The sensing unit 110 may include at least one of a temperature/humidity sensor 232, an infrared sensor 233, an atmospheric sensor 235, a proximity sensor 236, or an RGB sensor (illuminance sensor) 237, but it is not limited thereto. A function of each sensor may be intuitively inferred by one of ordinary skill in the art based on its name.

Also, the sensing unit 110 may include a motion sensing unit 238 capable of sensing motion of an object. The motion sensing unit 238 may include a magnetic sensor 229, an acceleration sensor 231, and a gyroscope sensor 234.

The GPS 224 may be configured to estimate a geographical location. That is, the GPS 224 may include a transceiver configured to estimate a location of an object on.

The IMU 225 may be a combination of sensors configured to sense changes of location and alignment based on inertia acceleration. For example, the combination of sensors may include accelerometers and gyroscopes.

The RADAR sensor 226 may be configured to sense objects in a driving environment by using radio signals. Also, the RADAR sensor 226 may be configured to sense a speed and/or a direction of the objects.

The LIDAR sensor 227 may be configured to sense objects in a driving environment by using laser beams. Specifically, the LI DAR sensor 227 may include a laser light source and/or a laser scanner configured to emit a laser beam, and a sensor configured to sense reflection of the laser beam. The LIDAR sensor 227 may be configured to operate in a coherent (for example, using heterodyne sensing) or an incoherent sensing mode.

The image sensor 228 may include a still camera or a video camera configured to record a driving environment. For example, the image sensor 228 may include a plurality of cameras and the plurality of cameras may be arranged in a plurality of locations inside or outside of a vehicle.

The odometry sensor 230 may estimate a location and measure a moving distance. For example, the odometry sensor 230 may measure a value of a change of location by using the number of rotations of a wheel on a vehicle.

The storage 140 may include a magnetic disk drive, an optical disk drive, and a flash memory. Alternatively, the storage 140 may include a portable universal serial bus (USB™) data storage. The storage 140 may store system software for executing examples related to the embodiments of the disclosure. The system software for executing the examples related to the embodiments may be stored in a portable storage medium.

The communicator 160 may include at least one antenna for wireless communication with another device. For example, the communicator 160 may be used to wirelessly communicate with a cellular network or other wireless protocols and systems through Wi-Fi™ or Bluetooth®. The communicator 160 controlled by the processor 120 may transmit and receive radio signals. For example, the processor 120 may execute a program included in the storage 140 so that the communicator 160 may transmit and receive a wireless signal to and from a cellular network.

In addition, the communicator 160 may perform V2X communication.

The inputter 150 may be a device for a user to input data for controlling the electronic device 100. For example, the inputter 150 may include a key pad, a dome switch, a touch pad (a touch capacitance method, a pressure resistive method, an infrared detection method, a surface ultrasonic conductive method, an integral tension measuring method, a piezo effect method, etc.), a jog wheel, a jog switch, etc., but it is not limited thereto. Also, the inputter 150 may include a microphone and may be configured to receive an audio signal (for example, a voice command) from a user.

The outputter 130 may be a device that outputs an audio signal or a video signal. The outputter 130 may include a display 281 and a sound outputter 282.

The display 281 may include at least one of a liquid crystal display, a thin film transistor-liquid crystal display, an organic light-emitting diode, a flexible display, a three-dimensional (3D) display, or an electrophoretic display. The outputter 130 may include two or more displays 281.

The sound outputter 282 may output audio data received from the communicator 160 or stored in the memory 140. The sound outputter 282 may include a speaker, a buzzer, etc.

The inputter 150 and the outputter 130 may include a network interface and may be realized as a touch screen.

The processor 120 may execute the programs stored in the storage 140 to generally control the sensing unit 110, the communicator 160, the inputter 150, the storage 140, and the outputter 130.

The devices according to the embodiments of the disclosure may include a processor, a memory for storing program data and executing it, a permanent storage such as a disk drive, a communication port for handling communications with external devices, and user interface devices, etc. Methods implemented as software modules or may be stored on a computer-readable recording medium as computer-readable codes executable by the processor or program commands. Examples of computer-readable recording media may include magnetic storage media (for example, read-only memory (ROM), random-access memory (RAM), floppy disks, hard disks, etc.), optical reading media (for example, CD-ROM, a digital versatile disc (DVD), etc.), etc. The computer-readable recording media may be distributed in computer systems connected in networks and computer-readable codes may be stored and executed in a distributed fashion. Media may be computer-readable, stored in a memory and executed by a processor.

The embodiments of the disclosure may be indicated as functional block components and various processing operations. The functional blocks may be implemented as various numbers of hardware and/or software components performing specific functions. For example, the embodiments of the disclosure may implement direct circuit components, such as a memory, a processing circuit, a logic circuit, a look-up table, etc., which may perform various functions under control of one or more microprocessors or other control devices. The components of the disclosure may be implemented by software programming or software components. Similarly, the embodiments of the disclosure may include various algorithms implemented by a combination of data structures, processes, routines, or other programming components and may be implemented by programming or scripting languages, such as C, C++, Java™, assembler, and the like. Functions aspects may be implemented by an algorithm executed by one or more processors. Also, the embodiments of the disclosure may implement the related art for electronic environment settings, signal processing, and/or data processing. The terms, such as "mechanism," "element," "unit," etc., may be broadly used and are not limited to mechanical and physical components. The terms may denote a series of software routines in connection with a processor, etc.

Specific embodiments are described in the disclosure as examples, and the scope of the embodiments is not limited thereto.

While the embodiments of the disclosure have been described, it will be understood by one of ordinary skill in the art that various changes in form and details may be made therein without departing from the spirit and scope of the disclosure as defined by the following claims. Therefore, the embodiments of the disclosure described above should be interpreted as examples and do not limit the embodiments in all aspects. For example, each component described as a single unit may be executed in a distributed fashion, and likewise, components described as being distributed may be executed in a combined fashion.

The use of all examples or example terms (e.g., etc.) in the embodiments of the disclosure is for the purpose of describing the embodiments of the disclosure and is not intended to limit the scope of the embodiments of the disclosure.

Also, unless explicitly stated otherwise, expressions, such as "essential," "important," etc., associated with certain components, may not indicate absolute needs of the components.

It will be understood by one of ordinary skill in the art that the embodiments of the disclosure may be realized in modified forms without departing from the spirit and scope of the disclosure.

As the disclosure allows for various changes to the embodiments of the disclosure, the disclosure is not limited to particular embodiments, and it is to be appreciated that all changes, equivalents, and substitutes that do not depart from the spirit and technical scope of the disclosure are encompassed in the disclosure. Therefore, the embodiments of the disclosure described herein should be understood as examples in all aspects and should not be construed as limitations.

Also, the terms, such as "unit," "module," etc., denote a unit processing at least one function or operation, which may be implemented as hardware or software or a combination thereof.

A "unit" and a "module" may be stored in a storage medium that is to be addressed and may be implemented as a program executable by a processor.

For example, the "unit" and the "module" may refer to components, such as software components, object-oriented software components, class components, and task components, and may include processes, functions, attributes, procedures, subroutines, segments of program code, drivers, firmware, micro codes, circuits, data, a database, data structures, tables, arrays, or variables.

In the disclosure, an expression that "A may include one of a1, a2, and a3" may broadly denote that an example which may be included in an element A includes a1, a2, or a3.

The expression should not be construed as limited to the meaning that examples which may be included in the element A are necessarily limited to a1, a2, and a3. Thus, it should not be interpreted as excluding other elements than a1, a2, and a3, as examples included in the element A.

Also, the expression denotes that the element A may include a1, a2, or a3. The expression does not denote that the elements included in the element A are necessarily selected from a certain set of elements. That is, the expression should not be restrictively understood as denoting that a1, a2, or a3 necessarily selected from the set including a1, a2, and a3 are included in the element A.

Also, in the disclosure, the expression "at least one of a1, a2, and/or a3" denotes one of "a1," "a2," "a3," "a1 and a2," "a1 and a3," "a2 and a3," and "a1, a2, and a3." Thus, it should be noted that unless explicitly described as "at least one of a1, at least one of a2, and at least one of a3," the expression "at least one of a1, a2, and/or a3" is not to be interpreted as "at least one of a1," "at least one of a2," and "at least one of a3."

What is claimed is:

1. An electronic device loaded in road infrastructure, for assisting autonomous driving of a vehicle, the electronic device comprising:
   a communicator;
   a memory storing one or more instructions; and
   a processor configured to execute the one or more instructions stored in the memory to:
      obtain object data of an object located in a driving environment of the vehicle;
      based on determining that the object is incapable of communicating with the vehicle, obtain an object situation of the object, the object situation being determined based on the object data;
      determine whether the object situation is a dangerous situation;
      based on determining that the object situation is the dangerous situation, determine a message type as an emergency message and generate the emergency message with a decentralized environmental notification message (DENM) packet;
      based on determining that the object situation is not the dangerous situation, determine the message type as a default message and generate the default message with a cooperative awareness message (CAM) packet; and
      transmit the DENM packet or the CAM packet generated according to the determined message type through the communicator.

2. The electronic device of claim 1, wherein the processor is further configured to execute the one or more instructions to generate the DENM packet including information about the dangerous situation and transmit the DENM packet to the vehicle.

3. The electronic device of claim 2, wherein the processor is further configured to execute the one or more instructions to determine a transmission time point for transmitting the DENM packet based on a degree of danger of the dangerous situation.

4. The electronic device of claim 2, wherein the processor is further configured to execute the one or more instructions to determine a number of times to transmit the DENM packet, based on a degree of danger of the dangerous situation.

5. The electronic device of claim 1, wherein the processor is further configured to execute the one or more instructions to, based on determining that the object situation is not the dangerous situation, generate the CAM packet and transmit the CAM packet based on a pre-set cycle.

6. The electronic device of claim 1, wherein the processor is further configured to execute the one or more instructions to determine whether the object is capable of communicating with the vehicle, based on at least one of the obtained object data or identification information of the object, the identification information being transmitted from the object.

7. The electronic device of claim 1, further comprising a sensing unit comprising at least one sensor,
   wherein the processor is further configured to execute the one or more instructions to control the at least one sensor to obtain the object data of the object.

8. The electronic device of claim 1, wherein the processor is further configured to execute the one or more instructions to receive the object data obtained by an external server from the external server through the communicator.

9. The electronic device of claim 1, wherein the object data comprises at least one of a time point at which the object is sensed, a location of the object, a moving speed of the object, a moving direction of the object, or an expected moving path of the object.

10. The electronic device of claim 1, wherein the processor is further configured to execute the one or more instructions to analyze the object situation of the object, the object situation indicating whether the object is in the dangerous situation, based on the object data.

11. The electronic device of claim 1, wherein the processor is further configured to execute the one or more instructions to receive the object situation of the object, the object situation being determined by an external server, from the external server through the communicator.

12. A method of assisting autonomous driving of a vehicle, the method comprising:
   obtaining, by an electronic device loaded in road infrastructure, object data of an object located in a driving environment of the vehicle;
   based on determining that the object is incapable of communicating with the vehicle, obtaining, by the electronic device, an object situation of the object, the object situation being determined based on the object data;
   determining, by the electronic device, whether the object situation is a dangerous situation;
   based on determining that the object situation is the dangerous situation, determining a message type as an emergency message and generating the emergency message with a decentralized environmental notification message (DENM) packet;
   based on determining that the object situation is not the dangerous situation, determining the message type as a default message and generating the default message with a cooperative awareness message (CAM) packet; and
   transmitting the DENM packet or the CAM packet generated according to the determined message type through a communicator.

13. The method of claim 12, wherein the transmitting the DENM packet further comprises, based on determining that the object situation is the dangerous situation, generating the DENM packet including information about the dangerous situation and transmitting the DENM packet to the vehicle.

14. The method of claim 12, further comprising determining a transmission time point for transmitting the DENM packet based on a degree of danger of the dangerous situation.

15. The method of claim 12, further comprising determining a number of times to transmit the DENM packet, based on a degree of danger of the dangerous situation.

16. The method of claim 12, wherein the transmitting the CAM packet further comprises, based on determining that the object situation is not the dangerous situation, generating the CAM packet and transmitting the CAM packet based on a pre-set cycle.

17. The method of claim 12, further comprising determining whether the object is capable of communicating with the vehicle, based on at least one of the obtained object data or identification information of the object, the identification information being transmitted from the object.

18. A non-transitory computer-readable recording medium storing a program including executable instructions, which when executed by a processor, cause the processor to perform a method of assisting autonomous driving of a vehicle, the method comprising:

obtaining, by an electronic device loaded in road infrastructure, object data of an object located in a driving environment of the vehicle;

based on determining that the object is incapable of communicating with the vehicle, obtaining, by the electronic device, an object situation of the object, the object situation being determined based on the object data;

determining, by the electronic device, whether the object situation is a dangerous situation;

based on determining that the object situation is the dangerous situation, determining a message type as an emergency message and generating the emergency message with a decentralized environmental notification message (DENM) packet;

based on determining that the object situation is not the dangerous situation, determining the message type as a default message and generating the default message with a cooperative awareness message (CAM) packet; and transmitting the DENM packet or the CAM packet generated according to the determined message type through the communicator.

* * * * *